(12) United States Patent
Nakajima

(10) Patent No.: US 9,103,398 B2
(45) Date of Patent: Aug. 11, 2015

(54) VARIABLE DAMPING FORCE DAMPER

(75) Inventor: Kiyoshi Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/343,204

(22) PCT Filed: Aug. 31, 2012

(86) PCT No.: PCT/JP2012/005522
§ 371 (c)(1),
(2), (4) Date: Mar. 6, 2014

(87) PCT Pub. No.: WO2013/035290
PCT Pub. Date: Mar. 14, 2013

(65) Prior Publication Data
US 2014/0216870 A1 Aug. 7, 2014

(30) Foreign Application Priority Data
Sep. 10, 2011 (JP) ................. 2011-197754

(51) Int. Cl.
*F16F 9/348* (2006.01)
*F16F 9/46* (2006.01)
*B60G 17/08* (2006.01)
(Continued)

(52) U.S. Cl.
CPC .............. *F16F 9/3485* (2013.01); *B60G 17/08* (2013.01); *B60G 21/051* (2013.01); *F16F 9/3484* (2013.01); *F16F 9/3488* (2013.01);
(Continued)

(58) Field of Classification Search
CPC ........... F16F 9/34; F16F 9/3405; F16F 9/346; F16F 9/3214; F16F 9/3228; F16F 9/348; F16F 9/3481; F16F 9/3482; F16F 9/3488; F16F 9/464; F16F 9/465
See application file for complete search history.

(56) References Cited

U.S. PATENT DOCUMENTS 5,878,850 A * 3/1999 Jensen ........................ 188/267
2008/0277217 A1 11/2008 Nakajima et al.

FOREIGN PATENT DOCUMENTS

| EP | 1 990 557 A2 | 11/2008 |
|---|---|---|
| JP | S48-4466 Y1 | 2/1973 |

(Continued)

OTHER PUBLICATIONS

JP 57171133 English-language abstract.*
(Continued)

*Primary Examiner* — Nicholas J Lane
(74) *Attorney, Agent, or Firm* — Carrier Blackman & Associates, P.C.; William D. Blackman; Joseph P. Carrier

(57) ABSTRACT

A solenoid-type variable damping force damper prevents excessive opening of a valve plate when the damper operates at a high speed, thereby achieving reduced electric power consumption. A valve body of an expansion-side valve plate is opened by pressure of hydraulic oil flowing in from an expansion-side first communication oil passage, but at this time, the oil pressures on the side of the upper surface and on the side of the under surface of the valve body are substantially equal to each other within the expansion-side pressure accumulation chamber, owing partly to a flow of the hydraulic oil passing through flow rate adjustment holes. Therefore, even when the damper undergoes an expanding action at a high speed and the hydraulic oil flows in from the expansion-side first communication oil passage at a high inflow rate, the valve body of the expansion-side valve plate is less likely to open excessively.

5 Claims, 12 Drawing Sheets

(51) Int. Cl.
  *F16F 9/512* (2006.01)
  *B60G 21/05* (2006.01)
  *F16F 9/53* (2006.01)

(52) U.S. Cl.
  CPC ............... *F16F 9/464* (2013.01); *F16F 9/512* (2013.01); *F16F 9/535* (2013.01)

(56) References Cited

FOREIGN PATENT DOCUMENTS

| | | | | | |
|---|---|---|---|---|---|
| JP | 57171133 | A | * | 10/1982 | ................ F16F 9/44 |
| JP | 58009538 | U | * | 1/1983 | ................ F16F 9/46 |
| JP | 58106239 | A | * | 6/1983 | ................ F16F 9/34 |
| JP | 60122037 | U | * | 8/1985 | ................ F16F 9/46 |
| JP | 2008-275126 | A | | 11/2008 | |
| JP | 2008-309193 | A | | 12/2008 | |
| JP | 4599422 | B2 | | 12/2010 | |

OTHER PUBLICATIONS

JP 58106239 English-language abstract.*
Japanese Office Action issued on Sep. 24, 2014 in the corresponding JP Patent Application 2013-532430.

* cited by examiner

VARIABLE DAMPING FORCE DAMPER

TECHNICAL FIELD

The present invention relates to a solenoid-type variable damping force damper for use in a suspension of an automobile, and particularly relates to technology for preventing excessive opening of a valve plate when the damper operates at a high speed, thereby achieving reduced electric power consumption or the like.

BACKGROUND OF THE INVENTION

A suspension is an important element that significantly affects the driving stability of an automobile, and typically includes, as main components thereof, a link (such as an arm, rod, etc.) that supports a wheel to be movable vertically relative to a vehicle body, a spring that is flexible to absorb impact from a road surface or the like, and a damper for damping the oscillation of the spring. Such a damper for an automotive suspension is typically embodied as a tubular damper which includes a hollow cylinder filled with hydraulic oil, a piston configured to slide in the cylinder in an axial direction, and a piston rod having an end connected with the piston, where the hydraulic oil is caused to move between multiple oil chambers in response to movement of the piston. Such a tubular damper may be of a multi-tube type or a mono-tube type.

In the tubular dampers, the piston is typically provided with a communication oil passage and a flexible valve plate, such that the valve plate provides a flow resistance to the hydraulic oil moving between the oil chambers through the communication oil passage, thereby generating a damping force. However, such a damper has constant damping characteristics, and therefore, it cannot provide a ride quality and driving stability appropriate for the road surface condition and riding circumstances. To address such a problem, there is proposed a variable damping force damper in which contraction-side and expansion-side valve plates, each made of a magnetic material, are provided on upper and lower surfaces of a piston main body, respectively, and an annular electromagnetic coil for generating a magnetic field is disposed between an outer yoke and an inner yoke that constitute the piston main body, such that the strength of the magnetic field can be varied by controlling the amount of electric current supplied to the electromagnetic coil, whereby the valve opening characteristics of the valve plates (namely, damping force) can be varied continuously (see Patent Documents 1 and 2, for example).

PRIOR ART DOCUMENT(S)

Patent Document(s)

Patent Document 1: JP4599422B
Patent Document 2: JP2008-275126A

BRIEF SUMMARY OF THE INVENTION

Task to be Accomplished by the Invention

In the variable damping force dampers disclosed in Patent Documents 1 and 2 in which the valve plates are magnetically attracted at the end surfaces of the piston main body, an amount of electric power consumption can be considerably large when the damper operates at a high speed, as described in the following. Namely, in the dampers having the structure described above, when a large amount of hydraulic oil passes through the communication oil passage in response to a high-speed telescopic action of the damper, an oil pressure on the side of the communication oil passage (inner side) increases due to rapid inflow of the hydraulic oil into the communication oil passage, while an oil pressure on the side of the oil chamber (outer side) decreases due to the movement of the piston in a direction away therefrom, and these oil pressures can act to open the valve plate excessively. The magnitude of magnetic attraction force produced by the electromagnetic coil is inversely proportional to the square of the distance between the piston main body (outer yoke and inner yoke) and the valve plate, and therefore, when the amount of opening of the valve plate becomes large (when the valve plate moves away from the end surface of the piston main body by a certain distance) as described above, it becomes necessary to supply a large current to the electromagnetic coil to achieve a desired damping force. This unavoidably accelerates discharge of the onboard battery and increases fuel consumption due to an increase in the load of the alternator.

The present invention is made in view of the foregoing background, and an object of the present invention is to provide a solenoid-type variable damping force damper that can prevent excessive opening of a valve plate when the damper operates at a high speed, thereby achieving reduced electric power consumption or the like.

Means to Accomplish the Task

In a first aspect of the present invention, there is provided a variable damping force damper, including: a hollow cylinder (12) having hydraulic oil sealed therein; a columnar piston (16) configured to reciprocate in the cylinder and separate an interior of the cylinder into a first oil chamber (14 or 15) and a second oil chamber (15 or 14); and a piston rod (13) having the piston at an end thereof, wherein the piston includes: an inner yoke (32) made of a ferromagnetic material, the inner yoke being secured to the piston rod and having an outer peripheral surface coaxial with the cylinder; an outer yoke (31) made of a ferromagnetic material, the outer yoke having an inner peripheral surface coaxial with the outer peripheral surface of the inner yoke and opposing the outer peripheral surface of the inner yoke via a predetermined gap; an electromagnetic coil (43) disposed in the gap; a first communication oil passage (36, 37) in communication with the first oil chamber and having an opening in an axial end surface on a side of the second oil chamber; a valve plate (41, 42) configured to have elasticity and close the opening of the first communication oil passage, the valve plate being made of a ferromagnetic material and attracted in a closing direction by a magnetic force of the electromagnetic coil; a pressure accumulation housing (46, 47) secured to the axial end surface on the side of the second oil chamber and defining a pressure accumulation chamber (71, 72) on a side of the valve plate opposite to the opening; and a second communication oil passage (61, 62) connecting the pressure accumulation chamber and the second oil chamber with each other.

In a second aspect of the present invention, the valve plate is configured to cover substantially an entirety of the axial end surface on the side of the second oil chamber.

In a third aspect of the present invention, the valve plate is provided with a flow rate adjustment hole forming a part of the second communication oil passage In a fourth aspect of the present invention, wherein another valve plate is provided on a side of the first oil chamber, and further, first and second communication oil passages and a pressure accumulation housing are provided in correspondence with the valve plate provided on the side of the first oil chamber In a fifth aspect of the present invention, a predetermined gap is defined between an inner peripheral surface of the cylinder and an outer peripheral surface of the piston, and the second communication oil passage opens out in the gap.

In a sixth aspect of the present invention, the pressure accumulation housing is fastened to the inner yoke by a fastening member (13, 49), and at least a part of the second communication oil passage is formed in the fastening member on an axis of the same Effect of the Invention According to the present invention, as the piston moves in the cylinder along with a telescopic action of the damper, the hydraulic oil pushes the valve plate open and flows into the pressure accumulation chamber through the first communication oil passage, but the oil pressure on the side of the first communication oil passage and the oil pressure in the pressure accumulation chamber are in balance each other, and thus, excessive opening of the valve plate is suppressed. In the structure in which a predetermined gap is defined between an inner peripheral surface of the cylinder and an outer peripheral surface of the piston, and the second communication oil passage opens out in the gap, the second communication oil passage can be formed without passing through the valve plate, and thus, the present invention can be applied easily even to a mono-tube damper. Further, in the structure which includes a pressure accumulation housing fastened by an inner yoke fastening member to define a pressure accumulation chamber and in which at least a part of the second communication oil passage is formed in the fastening member on an axis of the same, the second communication oil passage can be formed without passing through the valve plate, and thus, the present invention can be applied easily even to a mono-tube damper.

DETAILED DESCRIPTION OF THE PREFERRED EMBODIMENT(S)

In the following, detailed description will be made of an exemplary embodiment, in which the present invention is applied to a mono-tube variable damping force damper constituting a rear suspension of an automobile, with reference to the drawings. It is to be noted that with regard to the members and positional relationships in the exemplary embodiment, description will be made on the assumption that the upward direction in FIG. 2 indicates the "upward" direction.
<<Structure of the Exemplary Embodiment>>
<Suspension>

As shown in FIG. 1, a rear suspension 1 in the exemplary embodiment is a so-called H-shaped torsion beam suspension. The rear suspension 1 includes left and right trailing arms 2, 3, a torsion beam 4 connecting intermediate portions of the trailing arms 2, 3 with each other, a pair of left and right coil springs 5 each serving as a suspension spring, and a pair of left and right dampers 6, and suspends left and right rear wheels 7, 8. Each damper 6 is a solenoid-type variable damping force damper, and the damping force thereof is variably controlled by an ECU, which may be disposed in the trunk room or the like.
<Damper>

As shown in FIG. 2, the damper 6 in the exemplary embodiment is of a mono-tube type (De Carbon type), and includes, as main components thereof, a hollow cylinder 12 filled with hydraulic oil, a piston rod 13 that is slidable relative to the cylinder 12 in an axial direction, a piston 16 mounted at an end (lower end) of the piston rod 13 and separating the interior of the cylinder 12 into an upper fluid chamber (one fluid chamber) 14 and a lower fluid chamber (the other fluid chamber) 15, a free piston 18 defining a high pressure gas chamber 17 in a lower part of the cylinder 12, a cover 19 for preventing adhesion of dust to the piston rod 13 and the like, and a bump stop 20 for exerting a cushioning effect at full bounce.

The cylinder 12 is connected with an upper surface of the trailing arm 2, which serves as a wheel-side member, via a bolt 21 inserted into an eyehole 12a provided in a lower end portion of the cylinder 12. The piston rod 13 has an upper threaded shaft 13b that is connected, by means of upper and lower bushes 22 and a nut 23, with a damper base (an upper part of a wheel house) 24 serving as a vehicle body-side member.
<Piston>

As shown in FIGS. 3 and 4, the piston 16 is constituted of a piston main body 30, an expansion-side valve plate 41, a contraction-side valve plate 42, an electromagnetic coil 43, upper and lower connection members 44 and 45, an expansion-side pressure accumulation housing 46, a contraction-side pressure accumulation housing 47, a piston ring 48, and a stepped bolt with a hexagonal hole (hereinafter, simply referred to as a bolt) 49.

The piston main body 30 is an integrally formed component made of a ferromagnetic material such as a ferrite-based material by means of powder metallurgy, die casting or the like, and includes a hollow cylindrical outer yoke 31 having an outer peripheral surface that opposes an inner peripheral surface of the cylinder 12 via a small gap, a columnar inner yoke 32 having the same axial length as that of the outer yoke 31 and having an outer peripheral surface that opposes an inner peripheral surface of the outer yoke 31 via a gap, and an annular connection member 33 that connects the outer yoke 31 and the inner yoke 32 with each other at an axially upper part of the piston 16. The inner yoke 32 includes upper and lower portions having respective female threaded bores 34, 35 formed on the axis thereof such that a male threaded portion 13a of the piston rod 13 and the bolt 49 are threadably engaged with the bores 34, 35, respectively. Further, the inner yoke 32 is formed with an expansion-side first communication oil passage 36 and a contraction-side first communication oil passage 37, each extending through the inner yoke 34 in the axial direction. In addition, the outer yoke 31 and the inner yoke 32 are provided with respective communication holes 38a, 38b for connecting an upper part of the expansion-side first communication oil passage 36 and a space on the outer periphery of the outer yoke 31 with each other as well as respective communication holes 39a, 39b for connect a lower part of the contraction-side first communication oil passage 37 and a space on the outer periphery of the outer yoke 31 with each other. Similarly to a piston of an internal combustion engine, the piston ring 48 consists of an annular member having an end gap (not shown in the drawings), and is fitted in a retaining groove 40 formed in a lower part of the outer yoke 31.

The expansion-side valve plate 41 is a disk-shaped member obtained by stamping a sheet of a ferromagnetic material having elasticity. The valve plate 41 includes a circular valve body 53 having a bolt hole 51 and flow rate adjustment holes 52 formed therein and a base portion 54 supporting the valve body 53. The valve plate 41 is fastened to the under surface of the piston main body 30 by the bolt 49 via the expansion-side pressure accumulation housing 46. Similarly to the expansion-side valve plate 41, the contraction-side valve plate 42 also is a disk-shaped member obtained by stamping a sheet of a ferromagnetic material having elasticity. The contraction-side valve plate 42 includes a circular valve body 57 having a bolt hole 55 and flow rate adjustment holes 56 formed therein and a base portion 58 supporting the valve body 57, and is fastened to the top surface of the piston main body 30 by the piston rod 13 (male threaded portion 13a) via the contraction-side pressure accumulation housing 47. In this exemplary embodiment, each of the valve plates 41 and 42 is configured to have a thickness significantly larger than the thickness of the connection member 33.

The electromagnetic coil 43 is fitted in the gap between the outer yoke 31 and the inner yoke 32, and has lead wires 43a, 43b connected with power supply lines 60 arranged along the axis of the piston rod 13. The power supply lines 60 supply electric power from the damper controlling ECU, which may be disposed in the passenger compartment or the like of the automobile, to the electromagnetic coil 43.

Each of the connection members 44, 45 is an annular member made of a non-magnetic material (such as austenitic stainless steel or aluminum alloy), and is inserted into the gap between the outer yoke 31 and the inner yoke 32 to be secured to these yokes 31 and 32 by means of press-fitting, welding, adhesion or the like. The connection member 45 is provided with a communication hole 45a that constitutes a first radial oil passage 61 jointly with the communication holes 39a, 39b of the outer yoke 31 and the inner yoke 32. On the other hand, the connection member 44 is provided with a communication hole 44a that constitutes a second radial oil passage 62 jointly with the communication holes 38a, 38b of the outer yoke 31 and the inner yoke 32.

The expansion-side pressure accumulation housing 46 is an annular member having a bottom and made of a non-magnetic material similar to that of the connection members 44, 45. The pressure accumulation housing 46 has a bolt hole 70 at its center, through which the bolt 49 is inserted. The pressure accumulation housing 46 cooperates with the piston main body 30 to define an expansion-side pressure accumulation chamber 71 therebetween such that the expansion-side valve plate 41 is contained in the expansion-side pressure accumulation chamber 71. The contraction-side pressure accumulation housing 47 is configured similarly to the expansion-side pressure accumulation housing 46, and cooperates with the piston main body 30 to define a contraction-side pressure accumulation chamber 72 therebetween such that the contraction-side valve plate 42 is contained in the contraction-side pressure accumulation chamber 72.

<<Mode of Operation of the Exemplary Embodiment>>

As the automobile starts traveling, the ECU sets a target damping force of the damper 6 based on accelerations of the vehicle body obtained by a forward/rearward G sensor, a lateral G sensor and an upward/downward G sensor, a vehicle body speed input from a vehicle speed sensor, a rotation speed of each wheel obtained by a wheel speed sensor, etc., and supplies the electromagnetic coil 43 with drive current (excitation current). Consequently, the magnetic flux generated by the electromagnetic coil 43 reaches the ends of the outer yoke 31 and the inner yoke 32, whereby the expansion-side valve plate 41 and the contraction-side valve plate 42 are attracted by magnetic force.

<During Expanding Telescopic Action>

When the damper 6 undergoes an expanding telescopic action, as shown in FIG. 5, the hydraulic oil in the rod-side oil chamber 14 passes through the second radial oil passage 62 and the expansion-side first communication oil passage 36, opens the valve body 53 of the expansion-side valve plate 41, and flows into the expansion-side pressure accumulation chamber 71. The hydraulic oil that has flowed into the expansion-side pressure accumulation chamber 71 further passes through a gap between the expansion-side valve plate 41 and the piston main body 30, and thereafter, flows into the piston-side oil chamber 15 via a lower end part of the contraction-side first communication oil passage 37 and the first radial oil passage 61. Namely, in this exemplary embodiment, when the damper 6 undergoes an expanding telescopic action, the lower end part of the contraction-side first communication oil passage 37 and the first radial oil passage 61 function as an expansion-side second communication oil passage.

As described in the foregoing, the valve body 53 of the expansion-side valve plate 41 is opened by being pressed by the hydraulic oil flowing in from the expansion-side first communication oil passage 36, but at this time, the oil pressure on the side of the upper surface (the surface facing the electromagnetic coil 43) of the valve body 53 and the oil pressure on the side of the under surface of the same are substantially equal to each other within the expansion-side pressure accumulation chamber 71, owing partly to a flow of the hydraulic oil passing through the flow rate adjustment holes 52. Therefore, even when the damper 6 undergoes an expanding action at a high speed and the hydraulic oil flows in from the expansion-side first communication oil passage 36 at a high inflow rate, the valve body 53 of the expansion-side valve plate 41 is less likely to open excessively. Consequently, the ECU does not need to supply a considerably large amount of electric current to the electromagnetic coil 43 and may set substantially the same target electric current irrespective of the operation speed of the damper 6, and the controllability of the damping force is improved.

<During Contracting Telescopic Action>

When the damper 6 undergoes a contracting telescopic action, as shown in FIG. 6, the hydraulic oil in the piston-side oil chamber 15 passes through the first radial oil passage 61 and the contraction-side first communication oil passage 37, opens the valve body 57 of the contraction-side valve plate 42, and flows into the contraction-side pressure accumulation chamber 72. The hydraulic oil that has flowed into the contraction-side pressure accumulation chamber 72 further passes through a gap between the contraction-side valve plate 42 and the piston main body 30, and thereafter, flows into the rod-side oil chamber 14 via an upper end part of the expansion-side first communication oil passage 36 and the second radial oil passage 62. Namely, in this exemplary embodiment, when the damper 6 undergoes a contracting telescopic action, the upper end part of the expansion-side first communication oil passage 36 and the second radial oil passage 62 function as a contraction-side second communication oil passage.

As described in the foregoing, the valve body 57 of the contraction-side valve plate 42 is opened by being pressed by the hydraulic oil flowing in from the contraction-side first communication oil passage 37, but at this time, the oil pressure on the side of the under surface (the surface facing the electromagnetic coil 43) of the valve body 57 and the oil pressure on the side of the upper surface of the valve body 57 are substantially equal to each other within the contraction-side pressure accumulation chamber 72, owing partly to a flow of the hydraulic oil passing through the flow rate adjustment holes 56. Therefore, even when the damper 6 undergoes a contracting action at a high speed and the hydraulic oil flows in from the contraction-side first communication oil passage 37 at a high inflow rate, the valve body 57 of the contraction-side valve plate 42 is less likely to open excessively. Consequently, as in the expanding telescopic action, the ECU does not need to supply a large electric current to the electromagnetic coil 43 and may set substantially the same target electric current irrespective of the operation speed of the damper 6, and the controllability of the damping force is improved.

Next, with reference to FIGS. 7 to 11, modifications of the foregoing exemplary embodiment will be described. In these modified embodiments, the overall structure of the damper 6 is the same as that in the exemplary embodiment, and therefore, same members or parts are denoted by same reference numerals and redundant description will be omitted.

First Modified Embodiment

As shown in FIGS. 7 and 8, the piston 16 according to the first modified embodiment has substantially the same structure as that in the exemplary embodiment described above, but in the first modified embodiment, instead of the first radial oil passage, an axial oil passage 81 is formed in the bolt 49 on an axis of the same, and a communication oil passage 82 is formed in the inner yoke 32 to connect the contraction-side first communication oil passage 37 and the axial oil passage 81 with each other. The mode of operation in the first modified embodiment is substantially the same as that in the exemplary embodiment, except that the flow route of the hydraulic oil between the contraction-side first communication oil passage 37 and the piston-side oil chamber 15 is different.

Second Modified Embodiment

As shown in FIGS. 9 and 10, the piston 16 according to the second modified embodiment has substantially the same structure as that in the exemplary embodiment described above, but in the second modified embodiment, instead of the second radial oil passage, a communication hole 85 is formed in the contraction-side valve plate 42 so as to be connected with the expansion-side first communication oil passage 36, and a communication hole 86 is formed in the contraction-side pressure accumulation housing 47 to connect the rod-side oil chamber 14 and the contraction-side pressure accumulation chamber 72 with each other. The mode of operation in the second modified embodiment is substantially the same as that in the exemplary embodiment, except that the flow route of the hydraulic oil between the expansion-side first communication oil passage 36 and the rod-side oil chamber 14 is different. It is to be noted that, unlike the exemplary embodiment, there is no connection member provided in an upper part of the piston main body 30 in the second modified embodiment.

Third Modified Embodiment

As shown in FIG. 11, the piston 16 according to the third modified embodiment has substantially the same structure as that in the first modified embodiment described above, but in the third modified embodiment, the expansion-side pressure accumulation housing 46 has a larger axial length and a retaining groove 91 is formed on an outer periphery of the expansion-side pressure accumulation housing 46 such that the piston ring 48 is fitted in the retaining groove 91. The mode of operation in the third modified embodiment is substantially the same as that in the first modified embodiment, but by making the expansion-side pressure accumulation housing 46 and the piston ring 48 into a subassembly, for example, it is possible to facilitate assembly of the piston 16.

Description of the embodiments of the present invention has been provided in the foregoing. It is to be noted, however, that the mode of the present invention is not limited to the foregoing embodiments. For example, in the foregoing embodiments, the present invention was applied to a mono-tube variable damping force damper for use in a torsion beam rear suspension, but the present invention may be applied to a variable damping force damper for a strut or double wishbone suspension, a variable damping force damper for a front suspension, a variable damping force damper of a multi-tube type, and so on. Further, in the foregoing embodiments, each of the expansion-side valve plate and the contraction-side valve plate consists of a single plate, but the valve plate may be of a multi-plate type that is formed of a stack of circular thin plates. Further, in the foregoing embodiments, the second communication oil passage is formed in the inner yoke and the outer yoke, but as shown by solid line and long and double-short dashed line in FIG. 12, it is possible to remove the flow rate adjustment holes from the valve plate 41 and to form dedicated second communication oil passages 61, 61' in an end wall and/or a side wall of the pressure accumulation housing 46. Besides, the concrete structure of the damper and the piston as well as the concrete shape of various parts may be modified as appropriate within the scope of the spirit of the present invention.

Figure 1:
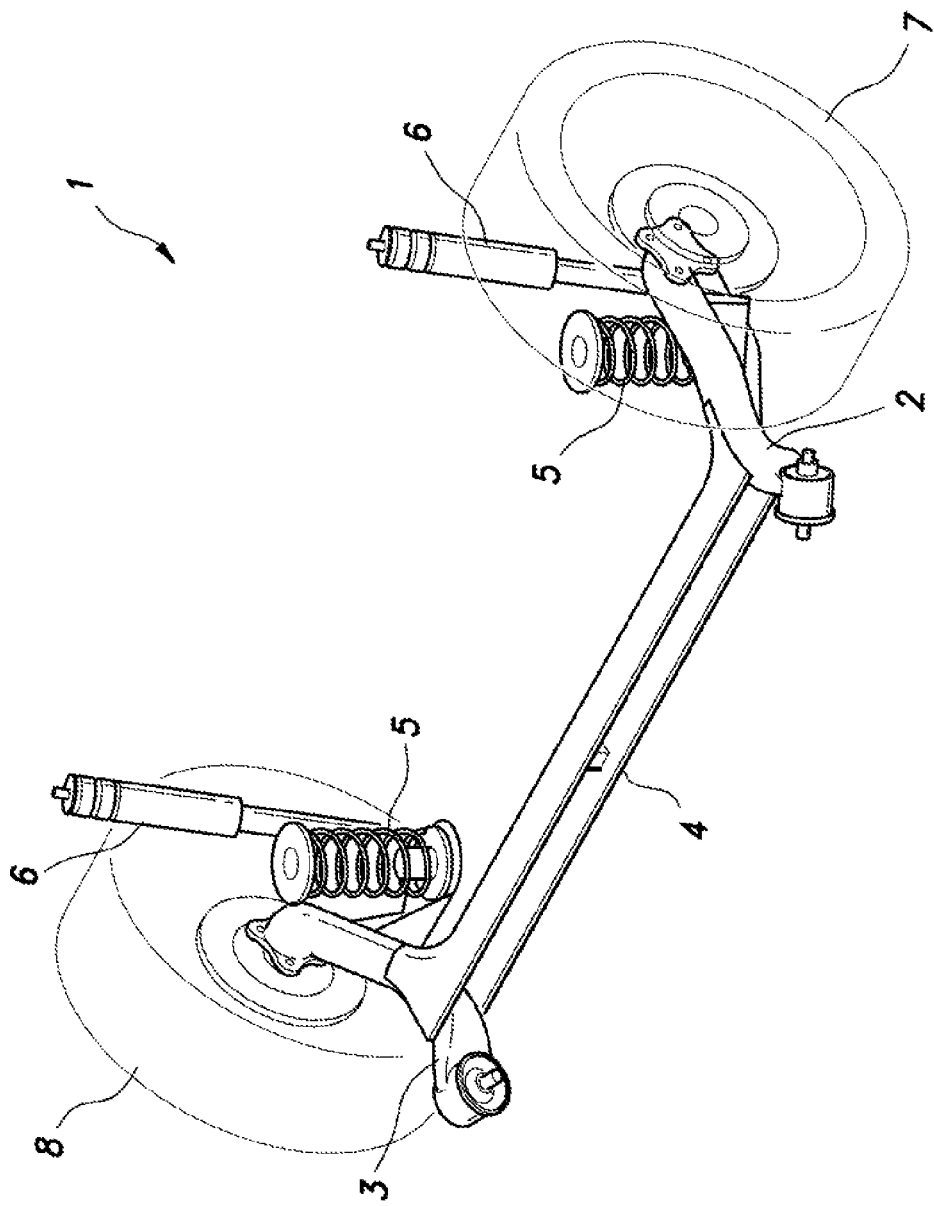
FIG. 1 is a perspective view showing a rear suspension for an automobile according to an exemplary embodiment of the present invention.
Figure 2:
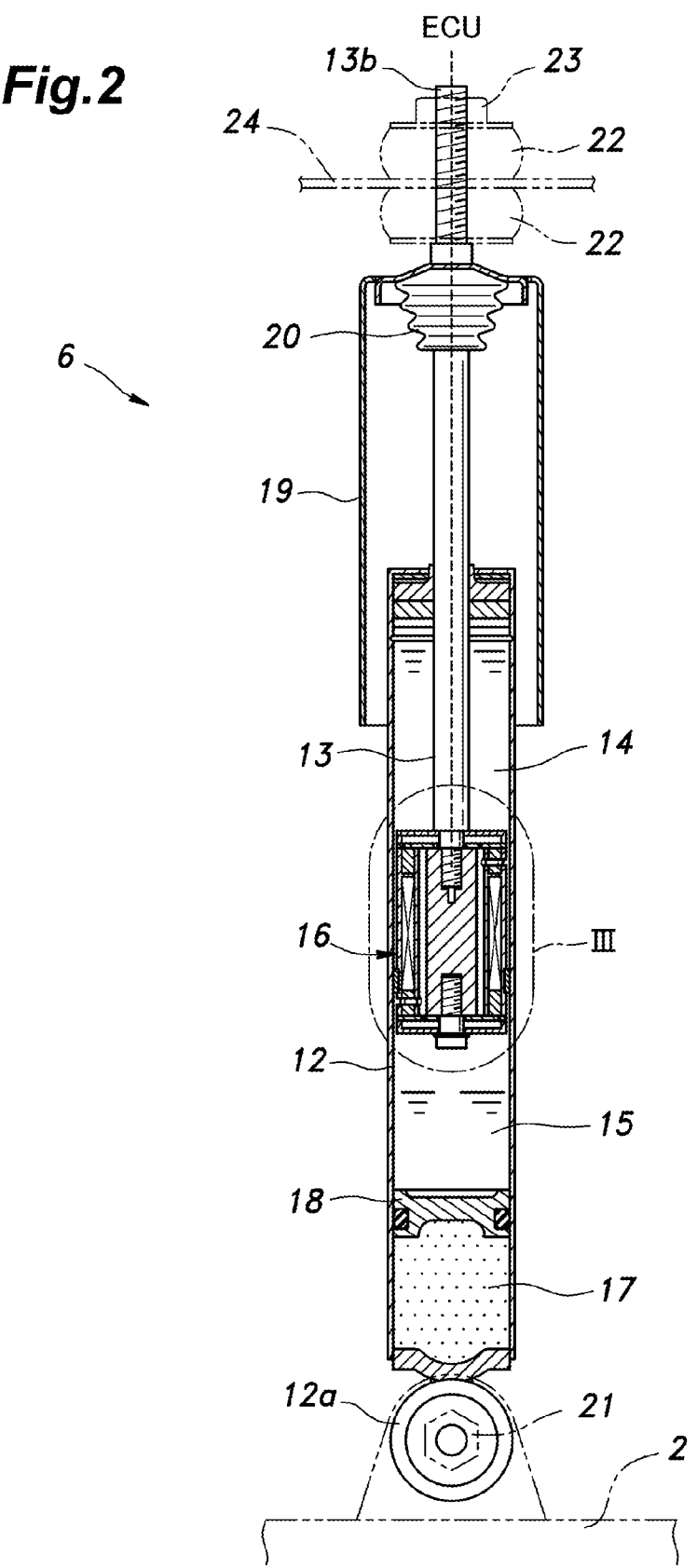
FIG. 2 is a longitudinal cross-sectional view of a variable damping force damper according to the exemplary embodiment.
Figure 3:
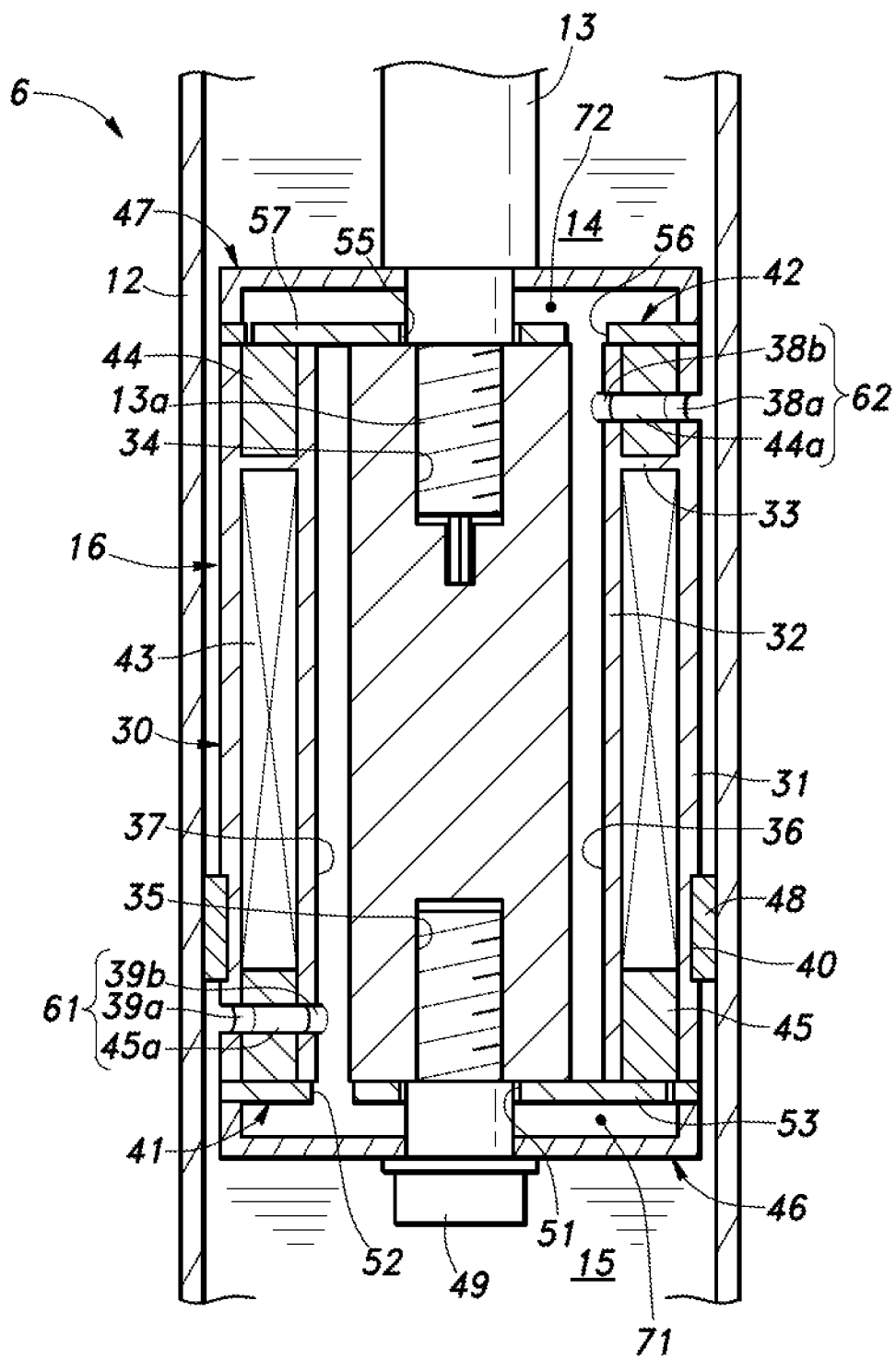
FIG. 3 is an enlarged view of a portion III in FIG. 2.
Figure 4:
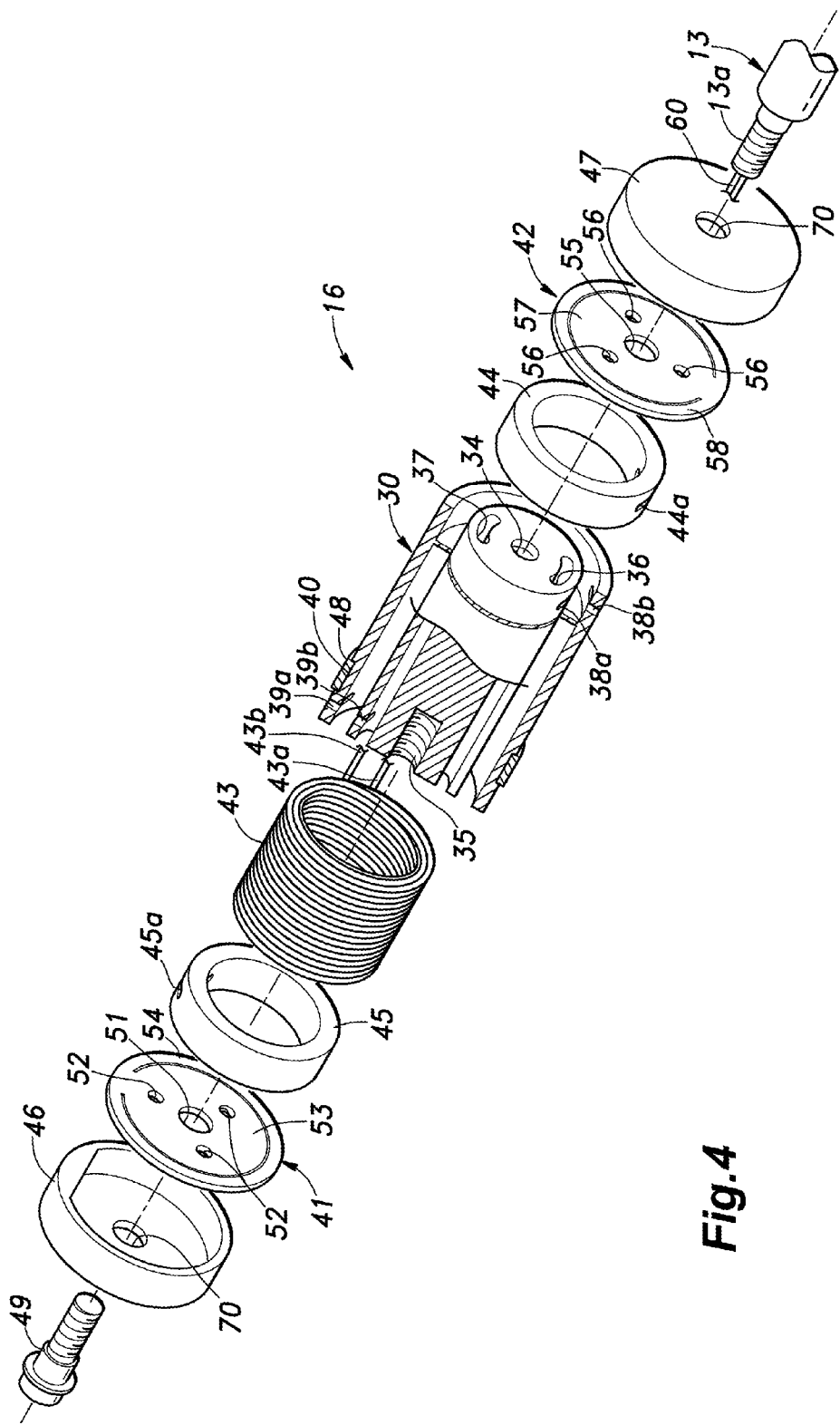
FIG. 4 is an exploded perspective view of the piston according to the exemplary embodiment.
Figure 5:
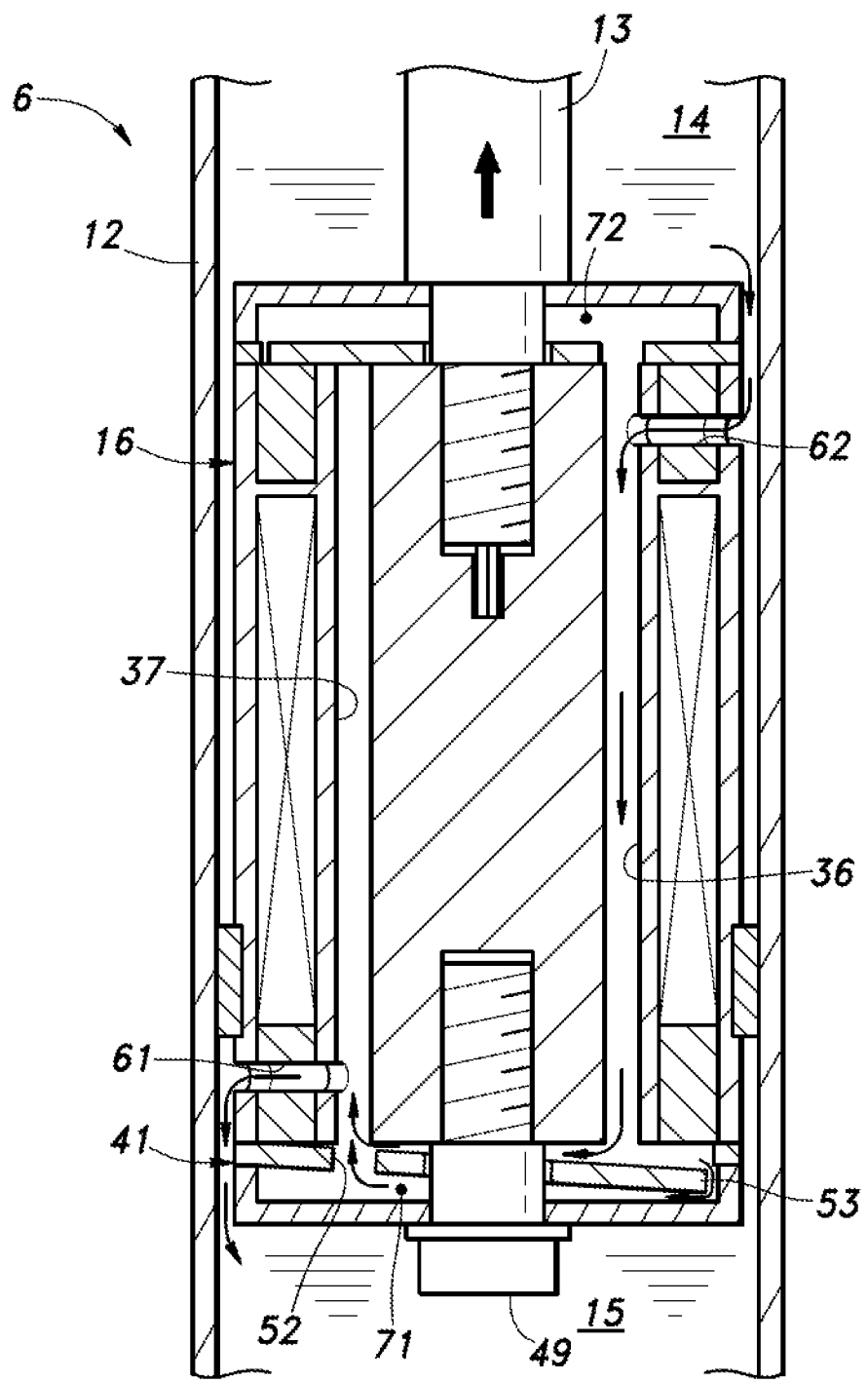
FIG. 5 is an enlarged fragmentary cross-sectional view showing a mode of operation of the damper according to the exemplary embodiment during expansion.
Figure 6:
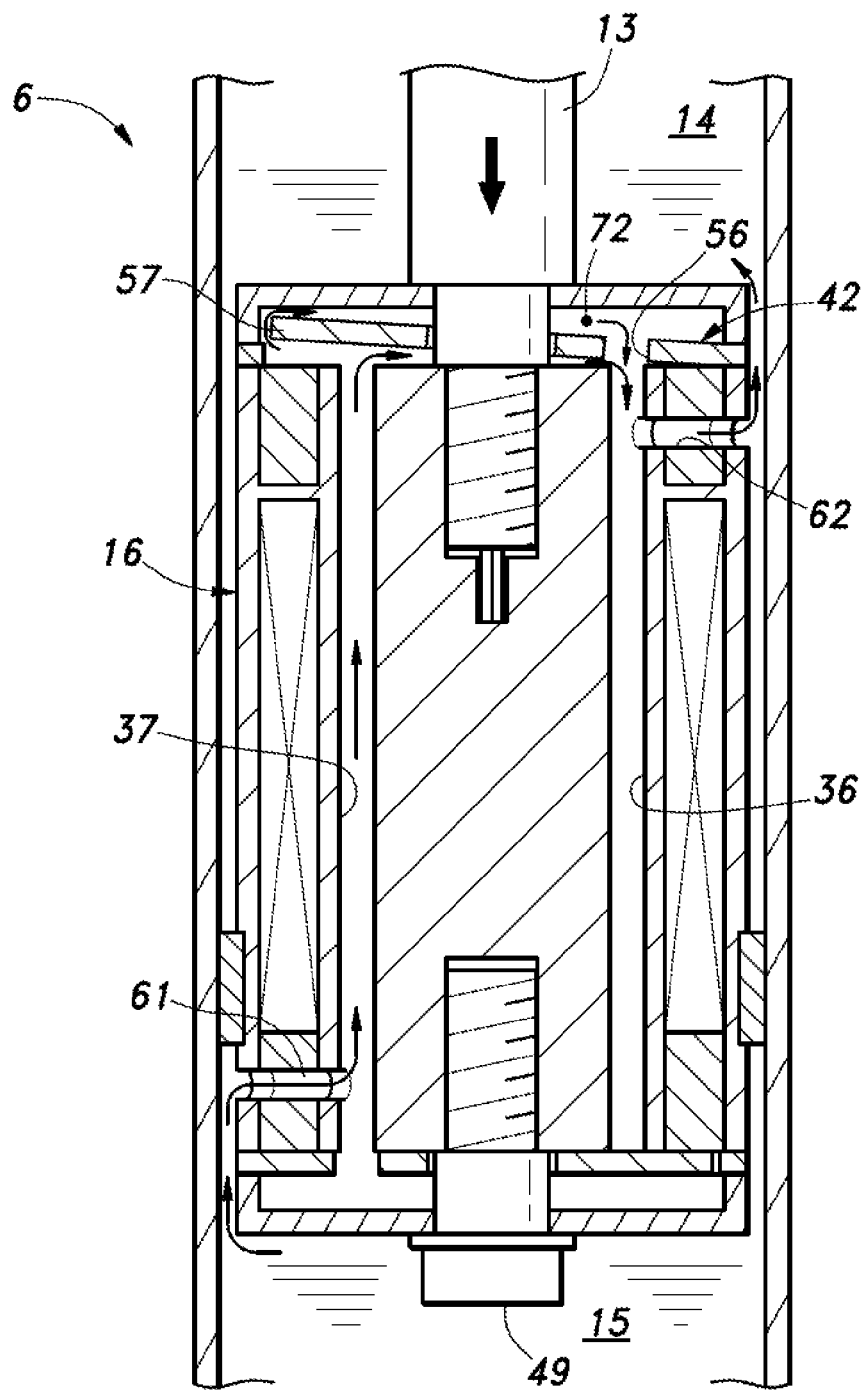
FIG. 6 is an enlarged fragmentary cross-sectional view showing a mode of operation of the damper according to the exemplary embodiment during contraction.
Figure 7:
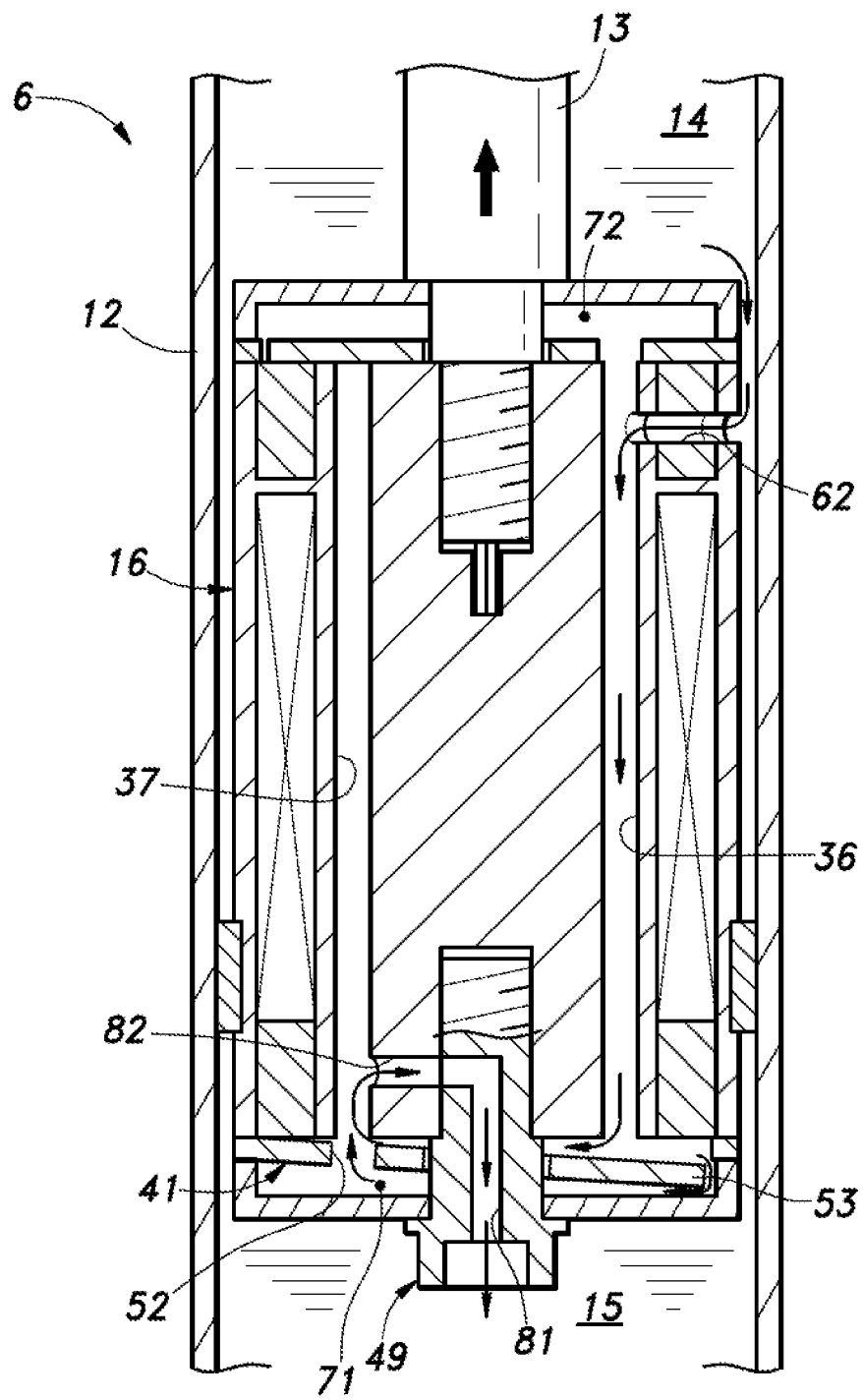
FIG. 7 is an enlarged fragmentary cross-sectional view showing a mode of operation of the damper according to a first modified embodiment during expansion.
Figure 8:
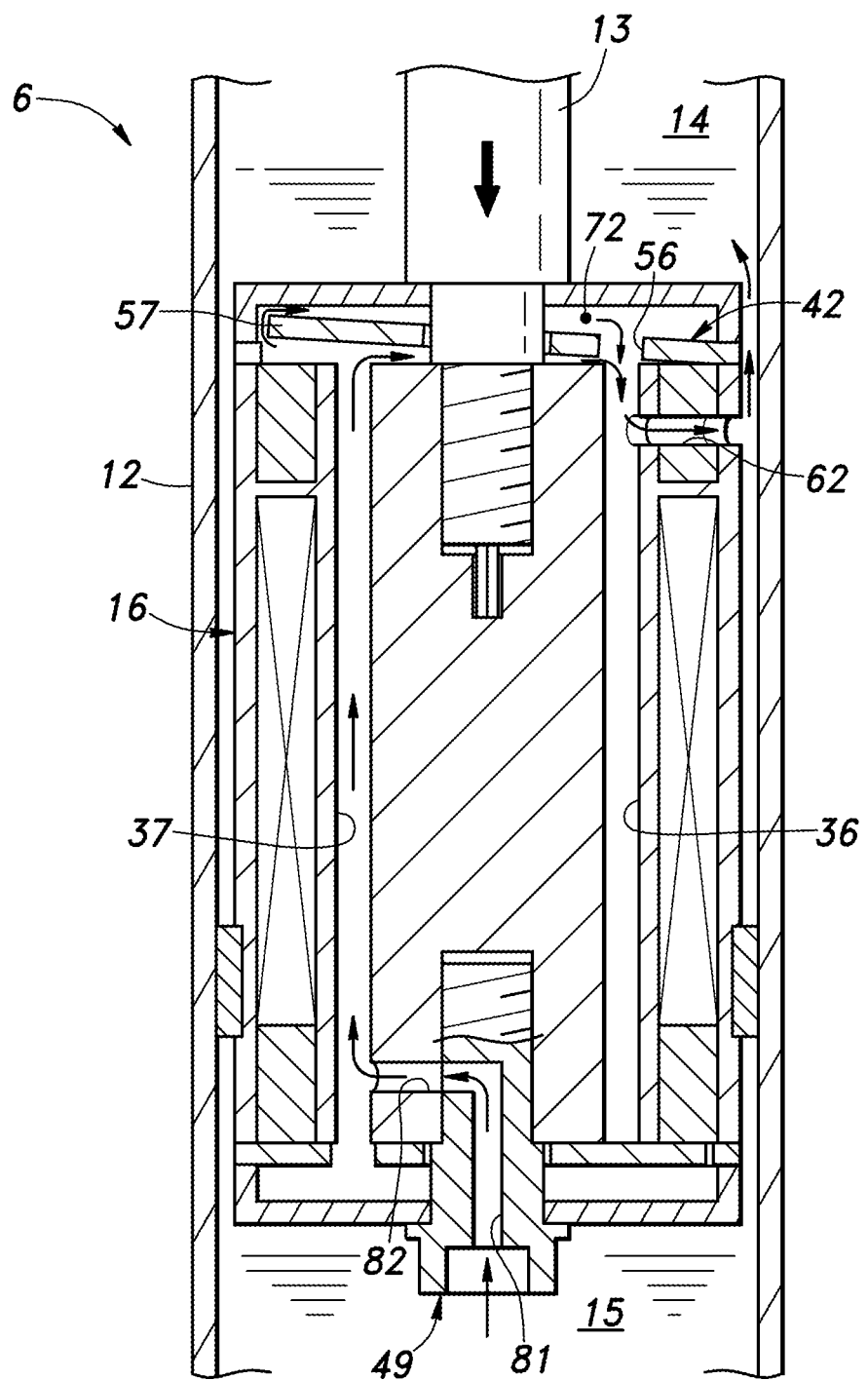
FIG. 8 is an enlarged fragmentary cross-sectional view showing a mode of operation of the damper according to the first modified embodiment during contraction.
Figure 9:
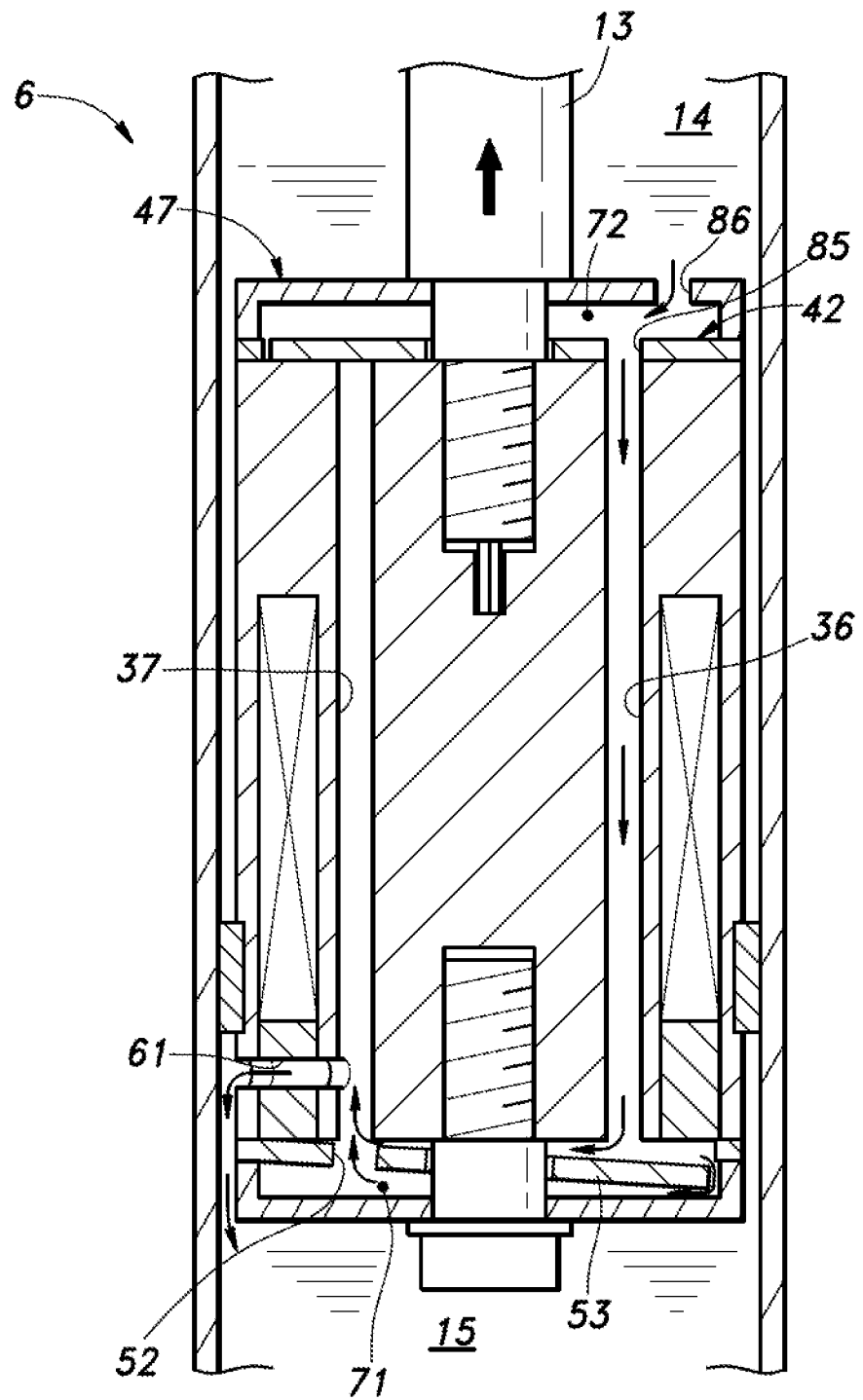
FIG. 9 is an enlarged fragmentary cross-sectional view showing a mode of operation of the damper according to a second modified embodiment during expansion.
Figure 10:
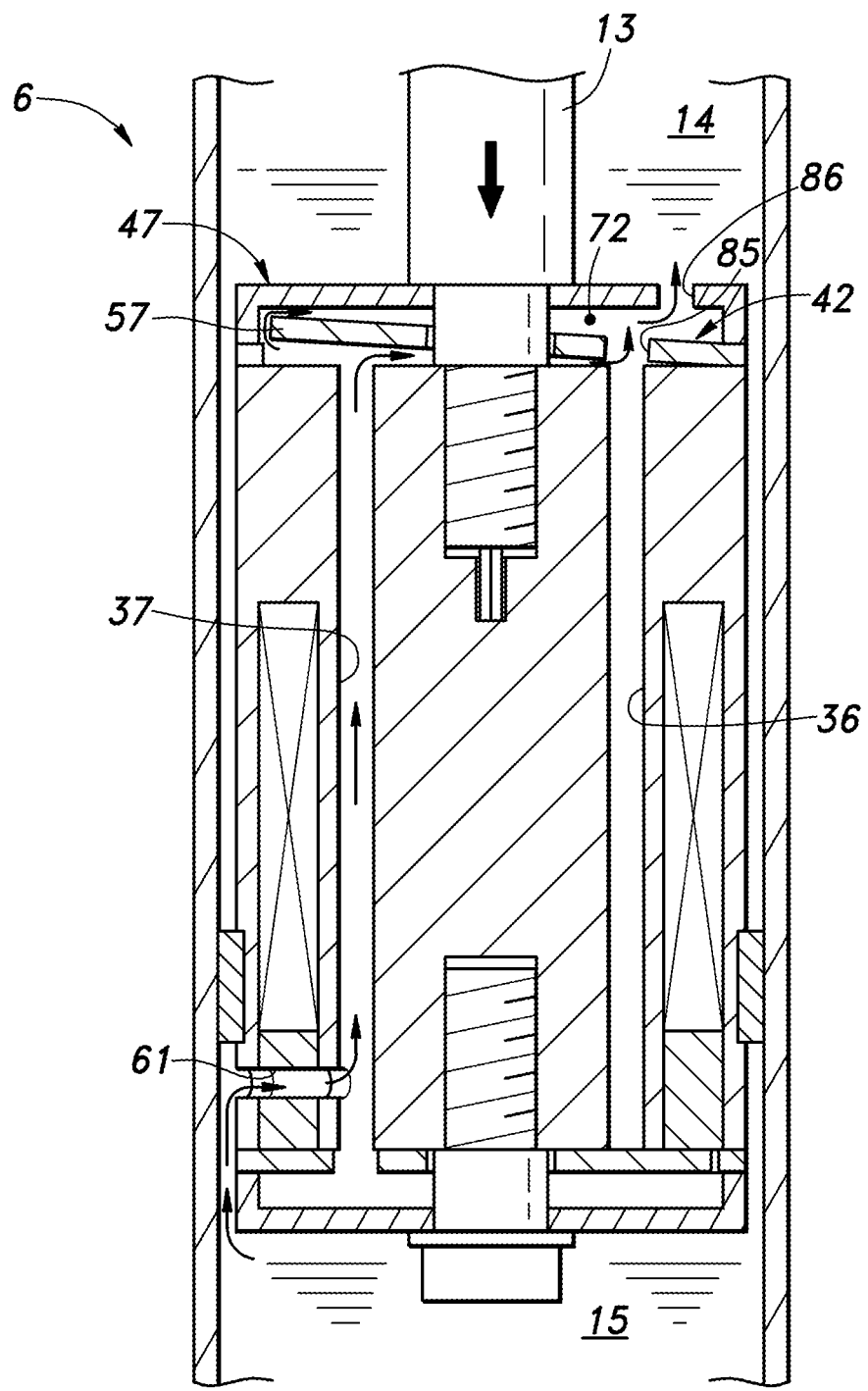
FIG. 10 is an enlarged fragmentary cross-sectional view showing a mode of operation of the damper according to the second modified embodiment during contraction.
Figure 11:
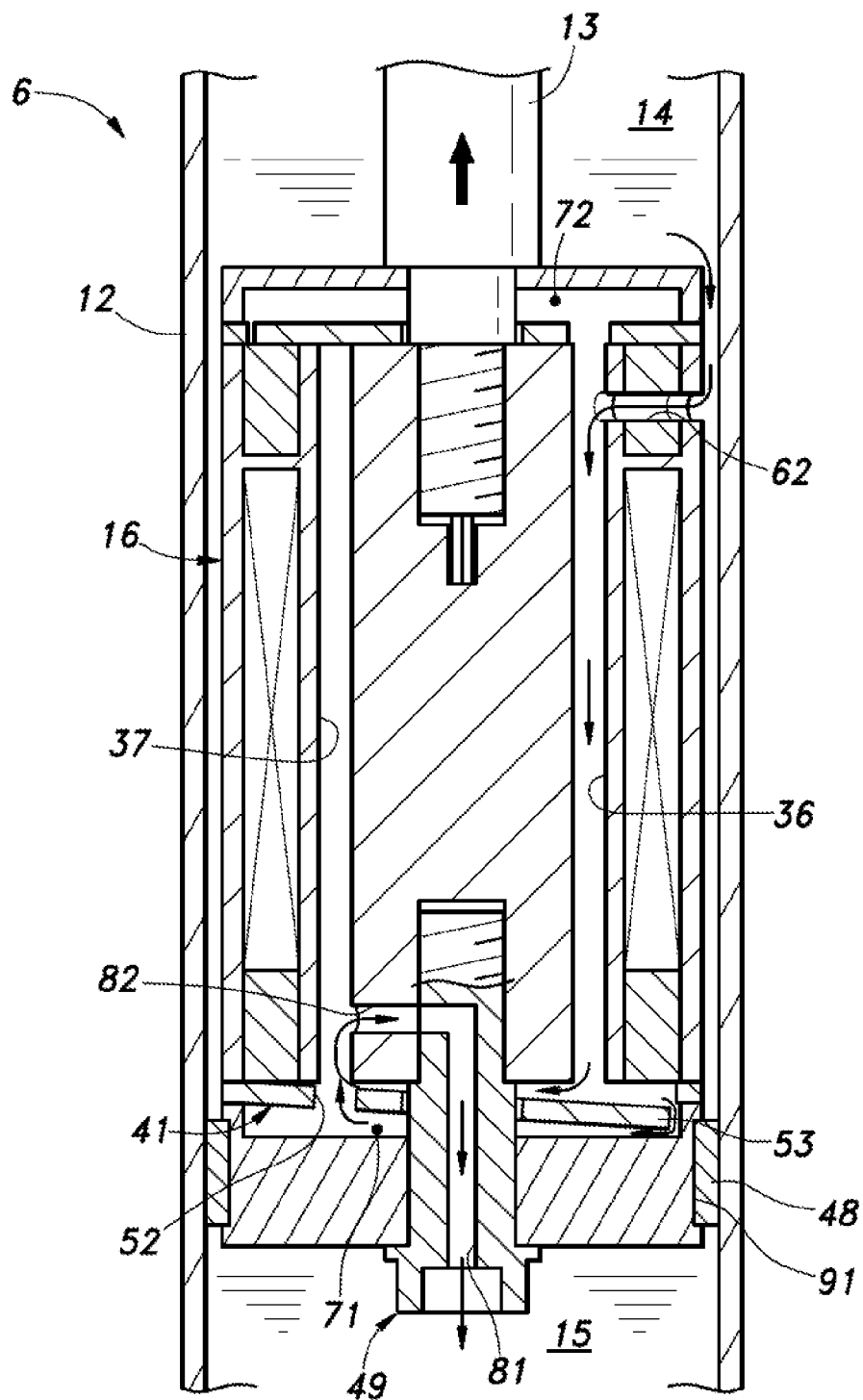
FIG. 11 is an enlarged fragmentary cross-sectional view showing a mode of operation of the damper according to a third modified embodiment during expansion.
Figure 12:
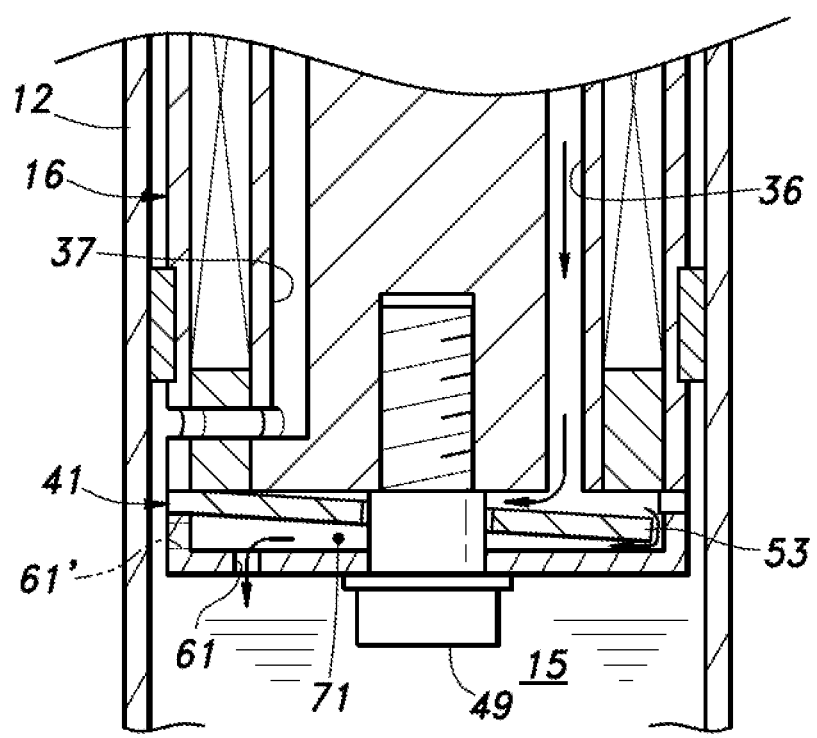
FIG. 12 is an enlarged fragmentary cross-sectional view showing a modified embodiment of a second communication oil passage.

The invention claimed is:

1. A variable damping force damper, comprising:
a hollow cylinder having hydraulic oil sealed therein;
a columnar piston configured to reciprocate in the cylinder and separate an interior of the cylinder into a first oil chamber and a second oil chamber; and
a piston rod having the piston at an end thereof,
wherein the piston comprises:
an inner yoke made of a ferromagnetic material, the inner yoke being secured to the piston rod and having an outer peripheral surface coaxial with the cylinder;

an outer yoke made of a ferromagnetic material, the outer yoke having an inner peripheral surface coaxial with the outer peripheral surface of the inner yoke and opposing the outer peripheral surface of the inner yoke via a predetermined gap;

an electromagnetic coil disposed in the gap;

a first communication oil passage in communication with the first oil chamber and having an opening in an axial end surface of the piston on a side of the second oil chamber;

a valve plate configured to have elasticity and close the opening of the first communication oil passage, the valve plate being made of a ferromagnetic material and attracted in a closing direction by a magnetic force of the electromagnetic coil;

a pressure accumulation housing secured to the axial end surface of the piston on the side of the second oil chamber and defining a pressure accumulation chamber on a side of the valve plate opposite to the opening;

a second communication oil passage connecting the pressure accumulation chamber and the second oil chamber with each other;

and wherein the pressure accumulation housing is fastened to the inner yoke by a fastening member, and at least a part of the second communication oil passage is formed in the fastening member on an axis of the fastening member.

2. The variable damping force damper according to claim 1, wherein the valve plate is configured to cover substantially an entirety of the axial end surface on the side of the second oil chamber.

3. The variable damping force damper according to claim 2, wherein the valve plate is provided with a flow rate adjustment hole forming a part of the second communication oil passage.

4. The variable damping force damper according to claim 1, wherein a second valve plate is provided on a side of the first oil chamber, and further, third and fourth communication oil passages, a second pressure accumulation housing and a second pressure accumulation housing are provided in correspondence with the second valve plate provided on the side of the first oil chamber, wherein:

the third communication oil passage is in communication with the second oil chamber and has an opening in an axial end surface of the piston on a side of the first oil chamber;

the second valve plate provided on the side of the first oil chamber is configured to have elasticity and close the opening of the third communication oil passage, the second valve plate being made of a ferromagnetic material and attracted in a closing direction by the magnetic force of the electromagnetic coil;

the second pressure accumulation housing is secured to the axial end surface of the piston on the side of the first oil chamber and defines a second pressure accumulation chamber on a side of the second valve plate opposite to the opening of the third communication oil passage; and the fourth communication oil passage connects the second pressure accumulation chamber and the first oil chamber with each other.

5. The variable damping force damper according to claim 1, wherein:

a predetermined gap is defined between an inner peripheral surface of the cylinder and an outer peripheral surface of the piston; and the second communication oil passage opens out in the gap.

* * * * *